United States Patent
LLorente Gonzalez et al.

(10) Patent No.: US 7,458,776 B2
(45) Date of Patent: Dec. 2, 2008

(54) WIND TURBINE YAWING SYSTEM, WIND TURBINE AND YAWING PROCESS

(76) Inventors: Jose Ignacio LLorente Gonzalez, Poligono Industrial Los Agustinos, Calle A s/n, 31012 Pamplona, Navarra (ES); Miguel Angel Gonzalez-Posada Martinez, Poligono Industrial Los Agustinos, Calle A s/n, 31012 Pamplona, Navarra (ES)

( * ) Notice: Subject to any disclaimer, the term of this patent is extended or adjusted under 35 U.S.C. 154(b) by 624 days.

(21) Appl. No.: 11/070,066

(22) Filed: Mar. 2, 2005

(65) Prior Publication Data
US 2005/0196280 A1 Sep. 8, 2005

(30) Foreign Application Priority Data
Mar. 4, 2004 (EP) ................... 04380046

(51) Int. Cl.
*F03D 7/02* (2006.01)
(52) U.S. Cl. .......................... 416/9; 415/123
(58) Field of Classification Search ........... 415/4.2–4.5, 415/122.1, 123, 907, 908; 416/9; 290/44, 290/55
See application file for complete search history.

(56) References Cited
U.S. PATENT DOCUMENTS
5,035,575 A * 7/1991 Nielsen et al. ................. 416/9
6,927,502 B2 * 8/2005 Wobben ...................... 290/44

OTHER PUBLICATIONS
Gasch R Ed- Gasch R (HRSG): "Windkraftanlagen", Windkraftanlagen. Grunlagen Und Entwurf, Stuttgart; B.G. Teubner, DE, 1997, p. 72,90, XP 002130509, ISBN: 3-519-26334-3, p. 70, paragraph 3, Figures 3.27,b.*

* cited by examiner

*Primary Examiner*—Edward Look
*Assistant Examiner*—Asefeh Hemmati
(74) *Attorney, Agent, or Firm*—Sanchelima & Assoc., P.A.

(57) ABSTRACT

A yawing system for a wind turbine, the wind turbine comprising a tower fixed to the ground and a frame (1) housing an electric power generator, the tower and the frame (1) being joined by the yawing system which allows the orientation of the frame (1) with respect to the tower according to the direction of the wind. The yawing system comprises:
  a gear ring (2) fixed to the tower, the gear ring having a sliding track (3) on which the frame (1) rests and slides in its yawing movement,
  at least one geared motor fixed to the frame (1), meshed with the gear ring (2) through a gear wheel,
  at least one active braking module (5), and
  at least one passive braking module (6).

The invention further comprises a sliding track (3) and a friction track on the gear ring, this friction track (10) being different from the sliding track (3), and the active braking modules (5) and passive braking modules (6) comprising a friction plate (11) acting on the friction track (10) of the ring. The frame (1) rests on the gear ring (2) by means of horizontal plates (8) and radial plates (9) made of a sliding material, and are kept in their position by separating parts (7). Furthermore, the gear ring (2) is divided into gear-toothed circular segments to favor its repair.

Other aspects are a wind turbine with the previous yawing system and a yawing process of a turbine by means of the previous yawing system.

15 Claims, 5 Drawing Sheets

WIND TURBINE YAWING SYSTEM, WIND TURBINE AND YAWING PROCESS

FIELD OF THE INVENTION

The invention is encompassed within the field of wind turbine orientation systems, particularly in reference to the means for moving the rotor of the wind turbine to orient it to the wind and to retain it when it is in its objective position, preventing the same wind from moving it.

BACKGROUND OF THE INVENTION

Wind turbines consist of a fixed tower which raises an electric generator connected to a rotor by mechanical means above the ground. The rotor is formed by a hub or base joining one or several blades which are responsible for transforming the kinetic energy of the wind into rotational movement of the rotor. The turbine is generally placed on a frame, which is able to move with respect to the tower supporting it such that it allows the rotor to be oriented in the direction of the wind. One manner of orientation can be letting the frame (forming part of what is usually called the nacelle of the wind turbine) freely rotate (leeward orientation), which frame would act like a wind vane. However, to obtain better functioning, a mechanical system is normally used to move the frame with the rotor to a desired orientation (windward orientation).

This rotation of the frame on a horizontal plane is called "yawing".

The mechanical systems for orienting a wind turbine with the wind generally consist of a gear ring, normally fixed to the tower, and a motor normally fixed to the frame with the generator and which makes the frame rotate by means of a gear wheel meshing with the gear ring. The problem posed by this process is that once the frame is located in one orientation by means of the motor, it does not remain immobile, but rather gusts of wind can exert a momentum which moves the frame. Therefore the motor must be constantly running, and the gear teeth of the ring and of the wheel undergo loads in both directions, causing allowances and the deterioration of the gear teeth, which requires costly repairs.

To solve this problem, several nacelle braking systems are placed. One example can be, seen in Japanese patent application JP-A-08 082 277, disclosing a hydraulic brake joined to the frame which acts on a disc joined to the tower.

Another example can be seen in U.S. Pat. No. 4,966,525 and U.S. Pat. No. 5,035,575, using the yawing system by means of a gear ring fixed to the tower and motors fixed to the frame, meshing with the ring. To block the movement of the frame, two motors are installed on the frame which, when it is desired for the latter to remain still, act with an opposite rotational direction, and which act in the same direction in order to make the frame rotate. Electromagnetically released security brakes applied on the shafts of the motors are also included. The swivel joint between the frame and the tower is by means of, a ball bearing.

Another type of yawing system is disclosed in U.S. Pat. No. 5,178,518. In this case, the frame rotates freely, it is not mechanically operated, and the brake systems this time are for preventing excessive yawing speeds in the frame (for both the yawing and pitching), and are controlled by the centrifugal force.

European patent EP-B1-0 945 613 discloses a yawing system where the frame rotates on a ball bearing. It includes a continuous passive braking system preventing the motor from being forced to operate due to small gusts of wind. To this end, it comprises friction plates on the frame which are pushed against the support ring in the tower by means of springs, on which ring the frame rotates. These plates can be placed in the upper track or in the lower track of the ring, or in a radial direction on a cylindrical surface joined to the tower. The braking force is passive, i.e. it is adjusted during the assembly of the nacelle, and this braking is always operating either against small gusts of wind or against the desired movement of orientation of the rotor. This patent also claims an embodiment including electrically driven disc braking devices (active braking device).

A yawing system by means of a gear ring in the tower and several motors in the frame, with a braking system by means of active and passive brakes, is also known. However, these brakes act on a surface which is also the frame support surface. This forces seeking a balance on that surface between the need for a good lubrication to facilitate the yawing movement of the frame and the need for a surface with a high coefficient of friction to favor the operation of the brakes.

The known systems have several drawbacks. One of them is that the braking systems do not have enough retention capacity against strong gusts of winds. Increasing the passive braking systems would require also increasing the power necessary to orient the rotor. Increasing the known active braking systems requires a larger friction surface or a greater force for acting on the elements joined to the tower (friction disc or the like), but the weight and space in the upper part of the tower forces making much sturdier towers, increasing the cost of the wind turbine. Braking by means of drive motors of an acceptable size in the towers themselves is neither enough to prevent movements due to strong gusts of wind.

Another problem is that the elements of the yawing system of the wind turbine, especially the gear ring, the nacelle support ball bearings and the braking systems undergo significant loads, which leads to the frequent need for repairs or replacements. A large braking system would require the disassembly of the nacelle in order to repair it.

On the other hand, the gear teeth of the gear ring may undergo wear and tear and/or breakage, and in the known systems, a breakdown in the bearings supporting the nacelle allowing the rotation on the tower, or in the ring where the motor meshes, requires the disassembly of the nacelle, taking it to ground level so as to carry out the repair.

To solve these problems, the yawing system for wind turbines of the invention has been developed.

DESCRIPTION OF THE INVENTION

One of the objectives of the invention is to provide a yawing system having elements which can be easily replaced in repair.

Another objective of the invention is to obtain a braking system with more capacity than the known systems, but which is compact, i.e. it occupies little space in the upper part of the tower.

Another objective of the invention is to obtain a braking system which can be easily adapted during the assembly to places with different wind conditions.

The yawing system of the wind turbine comprises, as in other known systems, a yawing system joining a tower fixed to the ground with a frame supporting the generator (and forming part of that which is called the nacelle of the wind turbine). This yawing system allows the orientation of the frame with respect to the tower according to the direction of the wind, and comprises at least the following elements:

a gear ring configured to be fixed to said tower, the gear ring having a sliding track on which the frame rests and slides in its yawing movement, and the gear ring having a gear-toothed surface configured for interacting with a gear wheel of a motor joined to the frame, so that said motor can make the frame rotate with respect to the gear ring.

at least one active braking module with at least one braking element shiftable between a first position and a second position, according to braking instructions, such that the active braking module exerts a first braking force when the braking element is in the first position, and a second braking force when the braking element is in the second position, the second braking force being greater than the first braking force.

at least one passive braking module.

In the invention, the gear ring comprises a core in which the sliding track and one friction track are defined, this friction track being different from the sliding track. Each one of the passive braking modules also comprises at least one friction plate exerting constant pressure on the friction track of the ring, and each one of the active braking modules comprises at least one friction plate associated to the shiftable braking element to exert pressure against said friction track according to the braking instructions.

In other words, two elements of the yawing system are comprised in the core of the ring: the sliding track which allows the frame to rotate by sliding, and the friction track where the braking modules of the frame are applied. Lesser need of space is thereby achieved, as there are neither friction tracks nor bearings separated from the ring. The fact that the two tracks are different prevents having to have a good sliding (low coefficient of friction) and good friction (high coefficient of friction) at the same time.

Furthermore, the active braking modules and the passive braking modules can comprise a body of equal dimensions and equal fixing means for fixing them to the frame, and one type of module can be replaced by the other. With this possibility, it is possible to vary the ratio between the number of active braking modules and the number of passive braking modules to have a braking effect adjusted to the circumstances of the wind of the place where the wind turbine is installed.

The fixing means for fixing the active and passive braking means to the frame can be arranged such that one module can be assembled and disassembled without needing to disassemble the frame or the nacelle, which implies an advantage in the event of repair or for the storage and adjustment.

The yawing system of a wind turbine of the invention can comprise yawing control means according to the need to move the frame or to keep it in its position, which can provide instructions to the active braking modules to shift them from the first position to the second position and vice versa, and which can also provide instructions to the motor.

The yawing system of the invention can also comprise a plurality of sliding plates of low friction material placed between the frame and the sliding track of the gear ring such that the forces in the axial direction and radial direction between the frame and the gear ring are transmitted through said sliding plates. These sliding plates can comprise a plurality of horizontal sliding plates which, when joined, form a horizontal circular ring, such that they transmit the axial forces between the frame and the sliding track, as well as a plurality of radial sliding plates which, when joined, form a cylindrical surface with an axis parallel to the turning axis of the frame, such that they transmit the radial forces between the frame and the sliding track. These plates imply an advantage with respect to other known systems including a bearing system, generally of ball bearings, since the plates occupy less space. The material of the sliding plates can be one of those with low friction known in the art, such as PET.

The yawing system of the invention can comprise a plurality of separating parts solidly connected to the frame arranged such that they drag the sliding plates, forcing them to move with the frame but keeping them in place on the sliding track. In the case that the sliding plates comprise horizontal and radial plates, each separating part can comprise a horizontal separating element and a vertical separating element, each separating part being fixed to the frame such that the horizontal separating element is placed on the surface of the sliding track of the gear ring, separating two horizontal sliding plates, and such that the vertical separating element separates two radial sliding plates, such that the separating parts drag the horizontal and vertical sliding parts at the same time.

These separating parts are joined to the frame with means allowing them to be assembled or disassembled independently, which implies an advantage for the assembly or replacement of these separating parts or of the sliding plates.

Furthermore, the separating parts can comprise a grease case in the horizontal separating element for greasing the sliding track of the ring, and a scraping element which is placed on the surface of the friction track of the gear ring when the separating part is fixed to the frame, to remove the grease which may slide onto the friction track.

Another possibility of the yawing system of the invention is for the gear ring to comprise a core of the ring and a plurality of equal circular gear-toothed segments which can be separated from the core. In this case, the ring comprises fixing means for fixing these gear-toothed circular segments to the core of the ring, such that when all the gear-toothed circular segments are assembled, they form a gear-toothed ring fixed to the core of the ring on which the gear wheel of the motor can mesh. The gear-toothed circular segments and the means for fixing them are arranged such that a single gear-toothed segment can be replaced without needing to disassemble the entire ring or disassemble any other gear-toothed segment.

This implies an advantage with respect to the rings of the known yawing systems which, in the event that any gear tooth must be repaired, require the ring to be disassembled and taken to ground level, or at least disassembling the nacelle or using complicated means for machining a new gear tooth or set of gear teeth.

In the yawing system of a wind turbine of the invention, the active braking modules can comprise a body with at least one cylinder and one shiftable piston inside it, with operating means for operating the piston according to braking instructions, such that when the braking module is in a first position, the piston pushes the friction plate of the module against the friction track of the gear ring with a first force, and when the module is in the second position, the piston pushes the friction plate with a second force, the second force being greater than the first force.

The passive braking modules can comprise a body with at least spring means inside them which push the friction plate of the module against the friction plate of the gear ring, and the spring element can have adjustment means for adjusting the pressure with which they push the friction plate, and these adjustment means can be adjusted without needing to disassemble the module.

In this case, both modules could be built from the same casting body in which a cylindrical housing has been machined. In the active modules, the hydraulic piston would function in the cylindrical housing, and the spring would function in the passive modules.

When the active braking means are in the first position according to the braking instructions, they push with a first force which can be comprised between zero and a residual braking force. In other words, when the active braking means are in the first position, they can either exert no effect on the yawing system, or they can continue to produce a residual braking which is added to the braking effect of the passive braking modules. When an active braking module is in the second position, it pushes the friction plate of the module against the friction track of the ring with a second force, greater than the first force, producing a greater braking effect.

In one particular case, the yawing system of the invention can comprise four active braking modules and four passive braking modules.

The invention also comprises the wind turbine assembly comprising a yawing system according to that described previously, a tower, a frame (forming part of the nacelle) and an electric power generator with a rotor moved by the wind.

Another aspect of the invention is a wind turbine yawing process according to that which has been described above, which process comprises the following steps:
  instructions are provided to the active braking modules so that they move to the first position. However, the passive braking means continue to exert the same braking force.
  the electric motors are activated to make the frame rotate on the ring until reaching the desired position oriented according to the wind, they are stopped and,
  instructions are provided to the active braking modules so that they move to the second position.

BRIEF DESCRIPTION OF THE DRAWINGS

A series of drawings will be briefly described below which will aid in better understanding the invention, and which are expressly related to an embodiment of said invention, presented as an illustrative and non-limiting example thereof.

DESCRIPTION OF AN EMBODIMENT OF THE INVENTION

Figure 1:
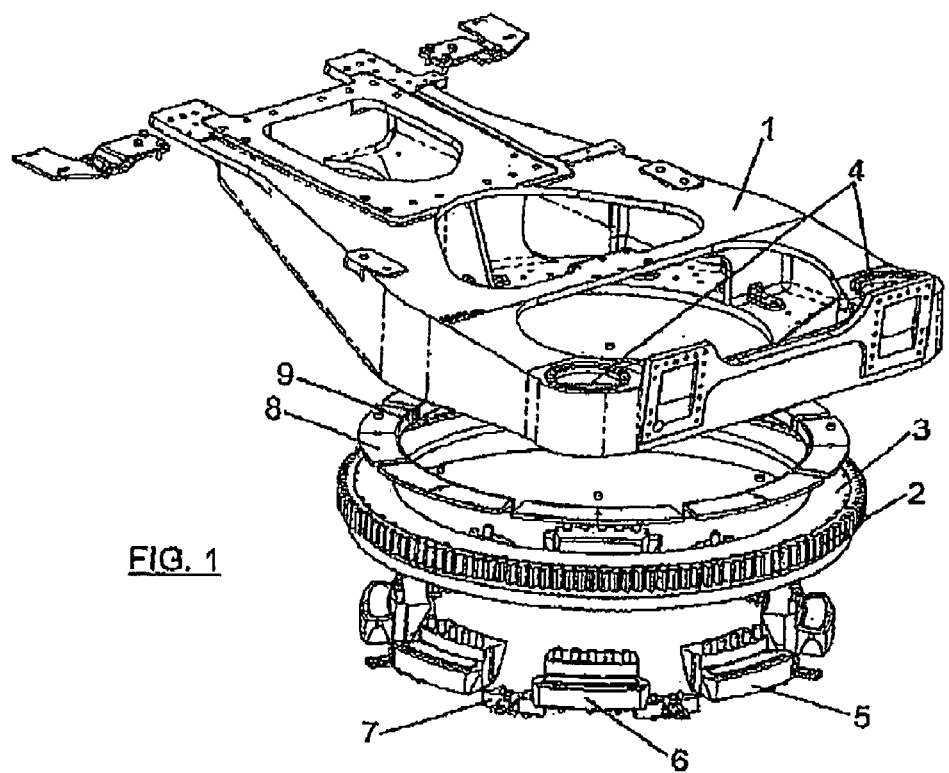
FIG. 1 shows an exploded view of the yawing system.

FIG. 1 shows an exploded view of the wind turbine yawing system of the invention. It comprises:
  A frame (1) on which all the mechanical and electric elements of the nacelle are assembled. The nacelle and the frame (1) must be to rotate in order to orient the generator according to the wind.
  A gear ring (2) solidly connected to a tower (29). The tower is fixed to the ground, and the ring, in its upper part, is also fixed. In the gear ring, there is a sliding track (3) on which the frame (1) rests and slides in its yawing movement. The friction track, located on the lower side of the ring, is not visible in this figure.
  In this example, two motors solidly connected to the frame (1), meshed to the gear ring (2) through a gear wheel; are provided, such that the rotation of the yawing movement of the frame can occur. Since the electric motors have a high number of revolutions, this rotational speed is transmitted to the gear wheel meshed with the ring, reduced through a reducer. Neither the motor nor the reducer, which would be placed in two spaces (4) of the frame, are shown in the example.

A plurality of active braking modules (5) (four in this example).
A plurality of passive braking modules (6) (four in this example).
A plurality of separating parts (7) solidly connected to the frame (eight in this example).
A plurality of sliding plates of low friction material located between the frame (1) and the sliding track (3) of the gear ring (2). These plates are of two types, horizontal plates (8) on which the forces are exerted in an axial direction, and radial plates (9) on which the forces are exerted in a radial direction. It is intended in the example that the material of the sliding plates is PET. The separating parts (7) are placed between two sets of horizontal and radial sliding parts (8, 9) such that the separating parts drag the sliding parts (8, 9), forcing them to move with the frame. The sliding plates (8, 9) are kept in their position in the frame by means of configurations in the gear ring and by the configuration of the separating parts which prevent these sliding plates from shifting outside the space between the frame and the sliding track of the gear ring.

Figure 2:
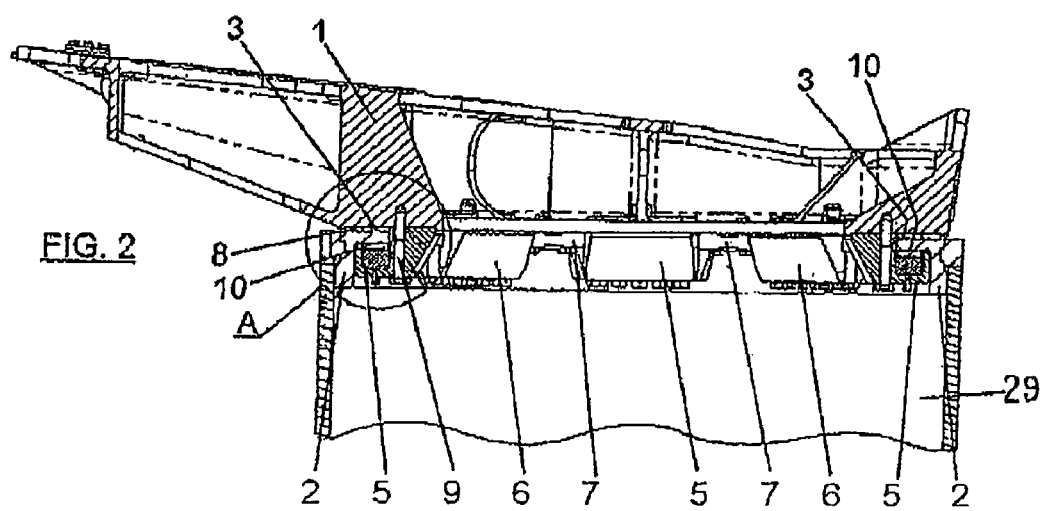
FIG. 2 shows a section view of the assembled yawing system.

FIG. 2 shows a section of the yawing system of the invention.

The frame (1) and the gear ring (2) can be seen in this section, and the horizontal sliding plates (8) and radial sliding plates (9) can be seen between the frame (1) and the sliding track (3) of the gear ring. As can be seen in the figure, the sliding track (3) has a horizontal surface where the horizontal sliding plates (8) rest, and a vertical surface where the radial sliding plates (9) rest.

The active braking modules (5) and passive braking modules (6) are fixed to the frame and are applied to the gear ring in a friction track (10) which, in this example, is horizontally located, parallel to the horizontal surface of the sliding track (3) but under the gear ring (2). There is a space between every two braking modules (5, 6) for fixing a separating part (7) to the frame.

Figure 3:
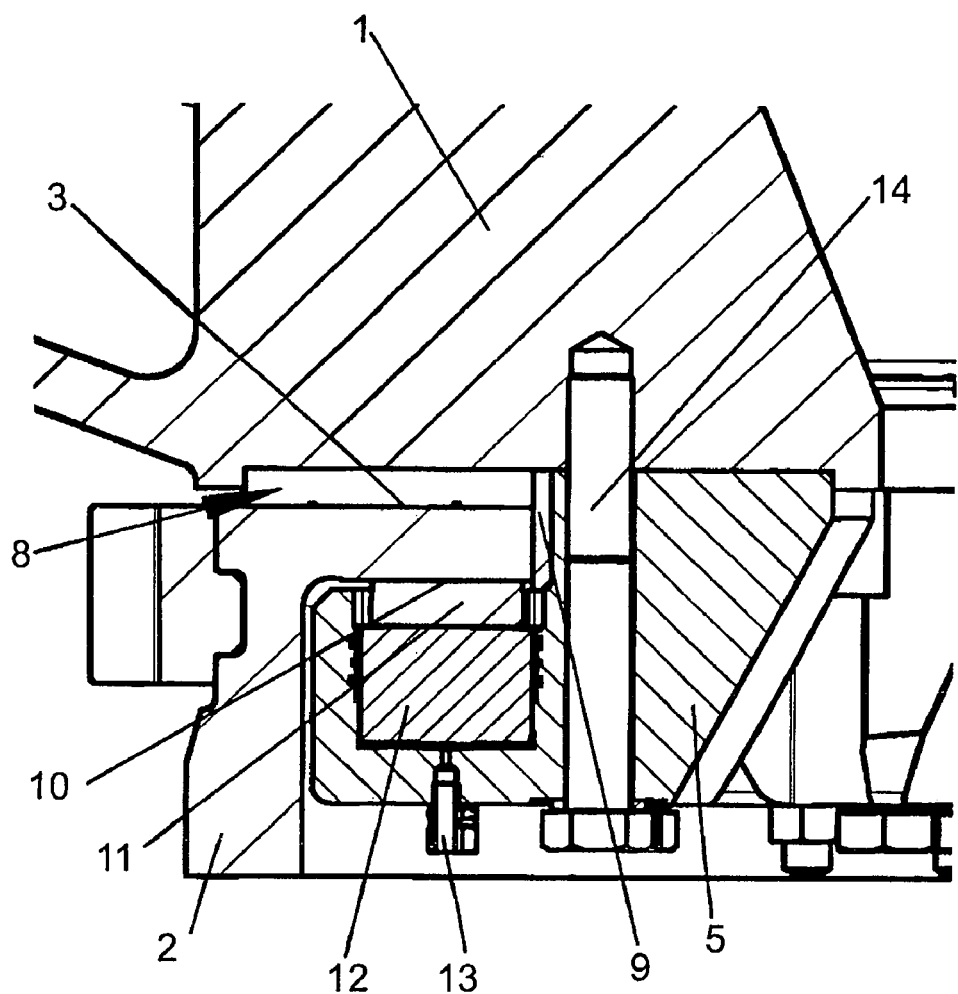
FIG. 3 shows a detail view of the previous section.

FIG. 3 shows detail A of FIG. 2. A section of an active braking module (5), with a friction plate (11) pushed against the friction track (10) of the ring, can particularly be seen in FIG. 3. In the case of the active braking modules (5), this friction plate is pushed by a hydraulic piston (12) contained in a cylindrical configuration which hydraulic fluid reaches by means of a nipple (13). The braking module is fixed to the frame (1) by means of screws (14).

Figure 4A:
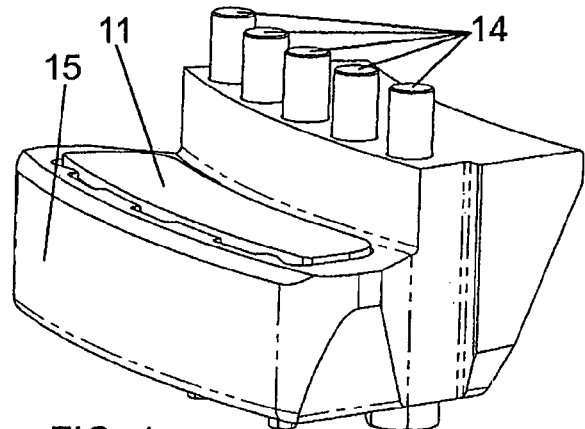
FIG. 4 shows the braking module.

FIG. 4 shows the braking modules (5, 6) separated form the frame. FIG. 4a shows a perspective view of a braking module with a body (15) which, from the outside, looks the same for the active braking modules (5) and passive braking modules (6). The friction plate (11), which is pushed by three hydraulic pistons or by three springs, which are not visible in the figure, can also be seen in the figure.

Figure 4B:
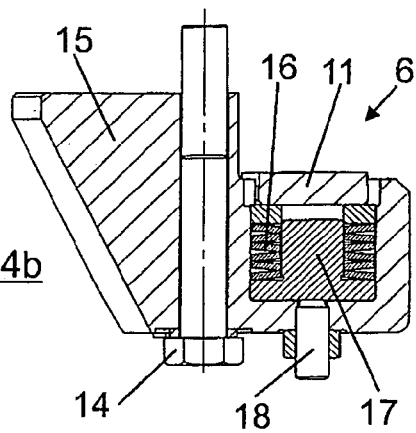

FIG. 4b shows a passive braking module (6). In the body (15), there are three cylindrical configurations (only one can be seen in the section shown in the figure) with a spring formed by spring washers (16) on a guide (17) which constantly push the friction plate (11). Adjustment means, which in this example are an adjusting screw (18), allow adjusting the force with which the spring washers (16) push the friction plate (11).

Figure 4C:
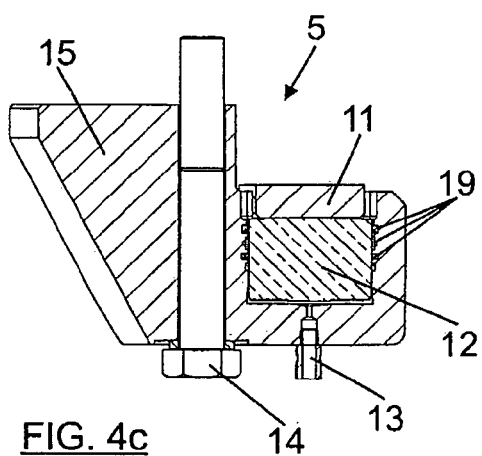

FIG. 4c shows an active braking module (5). In the body (15) similar to that of the passive braking module, there are also three cylindrical configurations (only one can be seen in the section shown in the figure), each one with a piston (12) pushed by hydraulic fluid reaching it by means of nipples (13). Means for the airtightness of the piston and the cylinder, which can consist of packers (19), can also be seen in the figure.

Figure 5:
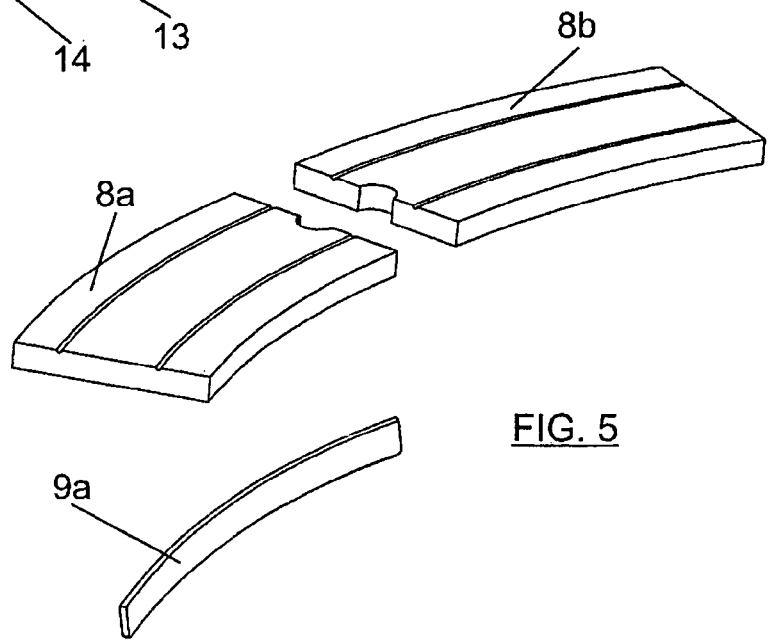
FIG. 5 shows sliding plates.

FIG. 5 shows a perspective view of the sliding plates (8, 9). In this example, the horizontal plates have been manufactured in two parts, a right-hand part (8a) and a left-hand part (8b). They are separated in the drawing, but they are placed next to one another in assembly, as if they were a single sliding plate (8). The radial plates (9) are also manufactured so that they correspond in length to the assembly of the horizontal sliding plates (8a, 8b), such that the arc covered by the two horizontal sliding plates (8a, 8b) corresponds to the arc covered by one of the radial plates (9).

Figure 6:
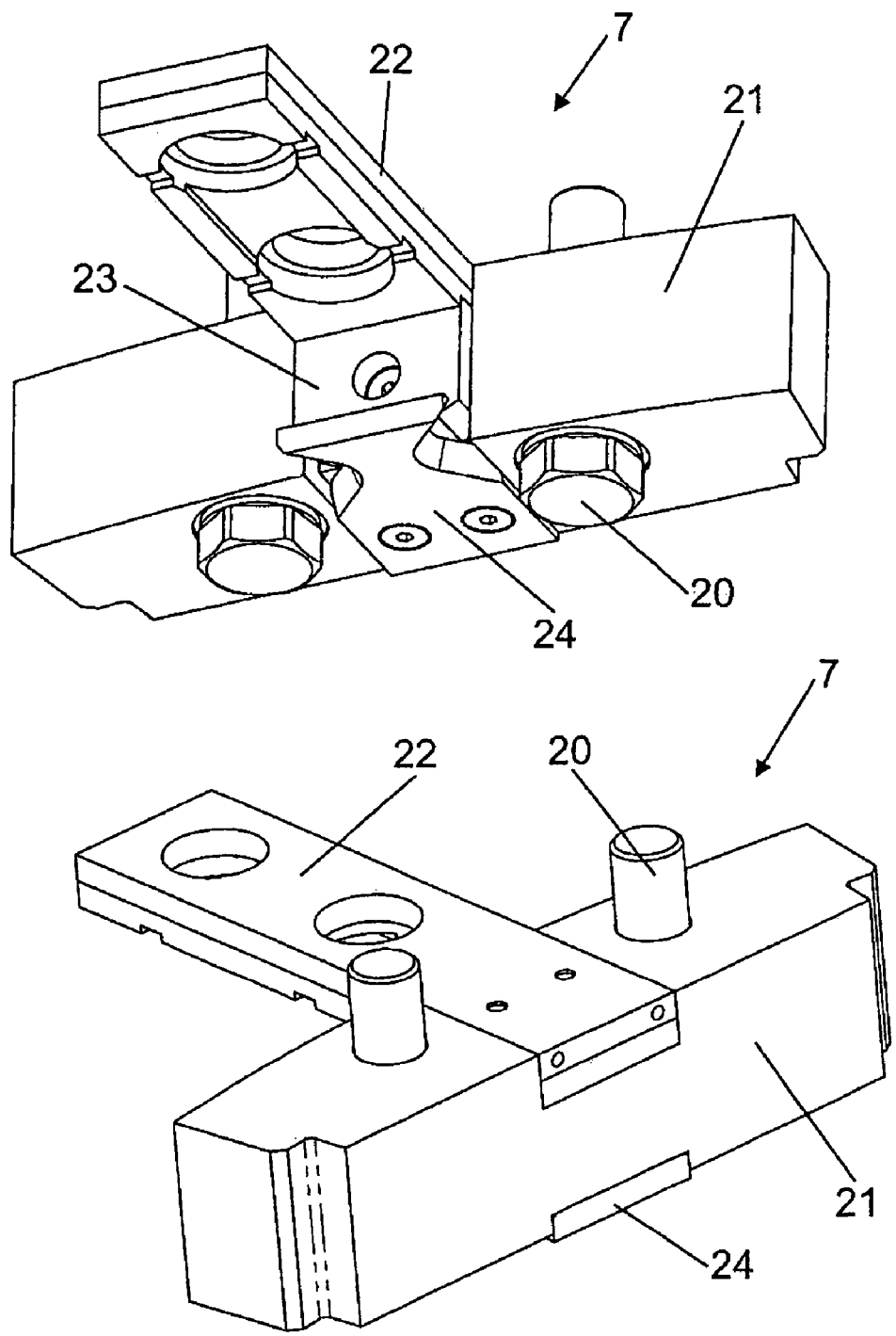
FIG. 6 shows a separating part.

FIG. 6 shows a separating part (7). The separating parts (7) are fixed to the frame (1) by means of screws, and it can be seen how it is located in FIG. 1. The separating part (7) comprises a central block (21), a horizontal separating element (22) with a grease case, a vertical separating element (23) and a scraping element (24). As can be seen in FIG. 1, when the yawing system is assembled and the separating part (7) is placed, fixed to the frame (1), the central block (21) is located between two braking modules,
the horizontal separating element (22) with the grease case is located between two horizontal sliding plates (8), on the sliding track (3) of the gear ring (2),
the vertical separating element (23) is located between two radial sliding plates (9), and
the scraping element (24) is placed on the friction track of the gear ring in order to clean off the grease.

The dimensions and manner of joining these separating parts (7) to the frame (1), in this example by means of screws (20), makes it easy to disassemble the part (7) for maintenance or repair, and when this separating part (7) is removed from its place, the disassembly of the sliding plates (8, 9) or of the braking modules (5, 6) located beside it, is facilitated.

Figure 7:
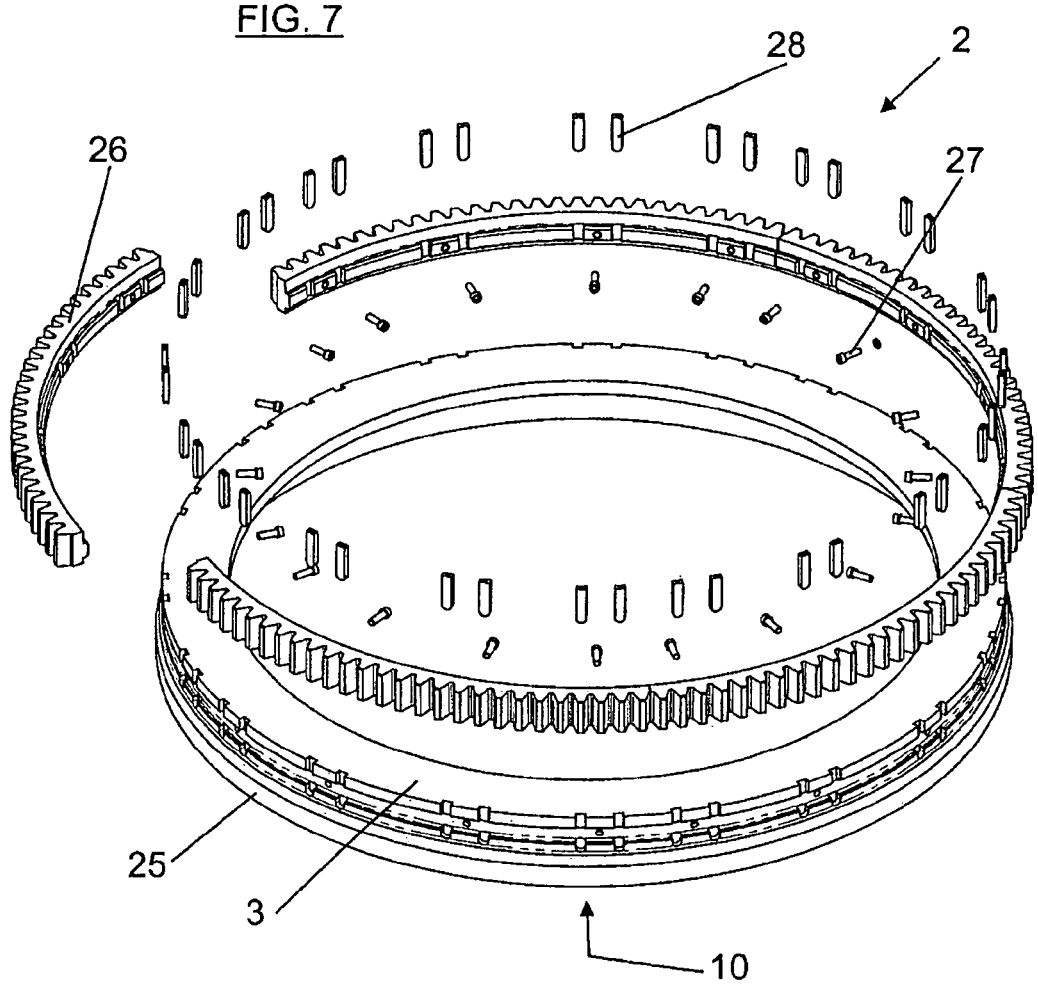
FIG. 7 shows an exploded view of the gear ring.

FIG. 7 shows another possible feature of the invention. The gear ring (2) comprises a core (25) which can be manufactured from casting, on which core the sliding track (3) and the friction track (10) are machined, and it also comprises a plurality of equal gear-toothed circular segments (26) and fixing means (27, 28) for fixing these gear-toothed circular segments (26) with the core (25) of the ring such that when all the gear-toothed circular segments (26) are assembled, they form a gear-toothed ring fixed to the core (25) of the ring (1) on which the gear wheel of the motor can mesh. The fixing means comprise a plurality of screws (27) and pins (28) in this example.

As can be seen in the figure, the gear-toothed circular segments (26) and the fixing screws (27) and pins (28) are arranged such that a single gear-toothed segment can be replaced without needing to disassemble the entire ring or disassemble any other gear-toothed segment.

The materials, size, shape and arrangement of the elements will be susceptible to variation, provided this implies no alteration of the basic concept of the invention.

Throughout the present description and claims, the word "comprises" and variations thereof, such as "comprising", do not intend to exclude other steps or components.

MEANING OF THE REFERENCES MARKED IN THE FIGURES

To better understand the invention, the meaning of the references marked in the figures are added below:
1. main frame
2. gear ring
3. sliding track
4. spaces for placing the geared motors
5. active braking modules
6. passive braking modules
7. separating parts
8. horizontal sliding plates
9. vertical sliding plates
10. friction track
11. friction plates
12. hydraulic piston
13. nipple
14. fixing screw of the braking module
15. body of the braking module
16. spring
17. spring guide
18. adjusting screw
19. packer
20. fixing screw of the separating part
21. central block of the separating part
22. horizontal separating element
23. vertical separating element
24. scraping element
25. core of the gear ring
26. gear-toothed circular segment
27. screw
28. pin
29. tower

The invention claimed is:

1. A yawing system for a wind turbine, the wind turbine comprising a tower (29) fixed to the ground and a frame (1) housing an electric power generator, the tower (29) and the frame (1) being joined by the yawing system to allow the orientation of the frame (1) with respect to the tower (29) according to the direction of the wind, the yawing system comprising:

a gear ring (2) configured to be fixed to said tower (29), the gear ring having a sliding track (3) on which the frame (1) rests and slides in its yawing movement, and the gear ring having a gear-toothed surface configured for interacting with a gear wheel of a geared motor joined to the frame, so that said geared motor can make the frame rotate with respect to the gear ring (2);

at least one active braking module (5) with at least one braking element (12) shiftable between a first position and a second position, according to braking instructions, such that the active braking module exerts a first braking force when the braking element is in the first position, and a second braking force when the braking element is in the second position, the second braking force being greater than the first braking force; and at least one passive braking module (6),
characterised in that
the gear ring (2) comprises a core (25) in which the sliding track (3) and a friction track (10) are defined, this friction track (10) being different from the sliding track (3), and in that each one of the passive braking modules (6) comprises at least one friction plate (11) exerting constant pressure on the friction track (10) of the ring, and in that each one of the active braking modules (5) comprises at least one friction plate (11) associated to the shiftable braking element (12) in order to exert pressure on said friction track (10) according to the braking instructions.

2. A yawing system according to claim 1, characterized in tat the active braking modules (5) and the passive braking modules (6) comprise a body (15) of equal dimensions and equal fixing means (14) for fixing them to the frame, such that in the yawing system, a module of one type can be replaced by a module of another type.

3. A yawing system according to claim 1, characterized in that the active braking modules (5) and the passive braking modules (6) comprise fixing means (14) for fixing them to the frame (1) arranged such that one braking module (5, 6) can be disassembled and assembled without needing to disassemble the frame or any other braking module.

4. A yawing system according to claim 1, characterized in that the system comprises yawing control means according to the need to move the nacelle or to keep it in its position, which means can provide instructions to the active braking modules to shift them from the first position to the second position and vice versa, and which can also provide instructions to the motor.

5. A yawing system according to claim 1, characterized in that it comprises a plurality of sliding plates (8,9) of low friction material located between the frame (1) and the sliding track of the gear ring such that the forces in an axial direction and in a radial direction between the frame (1) and the gear ring (2) are transmitted through said sliding plates.

6. A yawing system according to claim 1, characterized in that the sliding plates comprise a plurality of horizontal sliding plates (8) which, when joined, form a horizontal circular ring, such that they transmit the axial forces between the frame (1) and the sliding track (3), and in that they comprise a plurality of radial sliding plates (9) which, when joined, form a cylindrical surface with an axis parallel to the turning axis of the frame, such that they transmit the radial forces between the frame (1) and the sliding track (3).

7. A yawing system according to claim 1, characterized in that it comprises a plurality of separating parts (7) solidly connected to the frame (1) arranged such that they drag the sliding plates, forcing them to move with the frame (1), but keeping them in place on the sliding track (3).

8. A yawing system according to claim 1, characterized in that each separating part (7) comprises a horizontal separating element (22) and a vertical separating element (23), and in that each separating part is fixed to the frame such that the horizontal separating element (22) is located on the surface of the sliding track of the gear ring, separating two horizontal sliding plates (8), and such that the vertical separating element (23) separates two radial sliding plates (9), such that the separating parts drag the horizontal sliding parts (8) and the vertical sliding parts (9) at the same time.

9. A yawing system according to claim 1, characterized in that the separating parts (7) comprise a grease case in the horizontal separating element (22), and a scraping element (24) which is located on the surface of the friction track (10) of the gear ring when the separating part (7) is fixed to the frame (1).

10. A yawing system according to claim 1, characterized in that the gear ring (2) comprises a core (25) of the ring and a plurality of equal gear-toothed circular segments (26) which can be separated from the core (25), and fixing means (27, 28) for fixing these gear-toothed circular segments with the core (25) of the ring such that when all the gear-toothed circular segments (26) are assembled, they form a gear ring solidly connected to the core (25) of the ring on which the gear wheel of the geared motor can mesh, and the gear-toothed circular segments (26) and fixing means (27, 28) being arranged such that a single gear-toothed segment (26) can be replaced without needing to disassemble the entire ring or disassemble any other gear-toothed element.

11. A yawing system according to claim 1, characterized in that the active braking modules (5) comprise a body (15) with at least one cylinder and one shiftable piston (12) inside it, with operating means for operating the piston according to braking instructions, such that when the braking module (5) is in a first position, the piston (12) pushes the friction plate (11) of the module against the friction track (10) of the gear ring with a first force, and when the module is in the second position, the piston (12) pushes the friction plate (11) with a second force, the second, force being greater than the first force.

12. A yawing system according to claim 1, characterized in that the passive braking modules (6) comprise a body (15) with at least spring means (16) inside it which push the friction plate (11) of the module (6) against the friction track (10) of the gear ring, and in that the spring element (16) has adjustment means (18) for adjusting the pressure with which they push the friction plate, and in that these adjustment means (18) can be adjusted without needing to disassemble the module.

13. A yawing system according to claim 1, characterized in that it comprises four active braking modules (5) and four passive braking modules (6).

14. A wind turbine, comprising a tower, a frame (1) assembled on the tower such that it can rotate with respect to the tower by means of a yawing system, and an electric power generator fixed on the frame and provided with a rotor arranged so as to be moved by the wind, characterized in that the yawing system is a yawing system according to claim 1.

15. A yawing process for operating a wind turbine comprising: a gear ring (2) configured to be fixed to said tower (29), the gear ring having a slide track (3) on which the frame yawing movement, and the gear ring having a gear-toothed surface configured for interacting with a gear wheel of a geared motor joined to the frame, so that said geared motor can make the frame rotate with respect to the gear ring (2);

at least one active braking module (5) with at least one braking element (12) shiftable between a first position and a second position, according to braking instructions, such that the active braking module exerts a first braking force when the braking element is in the first position, and a second braking force when the braking element is in the second position, the second braking force being greater than the first braking force; and at least one passive braking module (6), characterised in that the gear ring (2) comprises, a core (25) in which tile sliding track (3) and a friction track (10) are defined, this friction track (10) being different from the sliding track (3), and in that each one of the passive braking modules (6) comprises at least one friction plate (11) exerting constant pressure on the friction track (10) of the ring, and in that each one of the active braking modules (5) comprises at least one friction plate (11) associated to the shiftable braking element (12) in order to exert pressure on said friction track (10) according to the braking instructions said yawing process comprising the following steps:

A) providing instructions to the active braking modules (5) of a yawing system so that they move to the first position;

B) activating the geared motors to make the frame (1) rotate on the ring (2) in said yawing system until reaching the desired orientation position according to the wind characteristics;

C) providing instructions to the active braking modules (5) so that they move to the second position.

* * * * *